(12) United States Patent
Li et al.

(10) Patent No.: US 11,947,072 B2
(45) Date of Patent: Apr. 2, 2024

(54) AUTOMATIC TRIGGER AND SELF-CALIBRATION ULTRASONIC RAIN MEASUREMENT SYSTEM

(71) Applicant: Hainan Acoustics Laboratory, Institute of Acoustics, Chinese Academy of Sciences, Haikou (CN)

(72) Inventors: Songbin Li, Haikou (CN); Mingyong Yuan, Haikou (CN); Peng Liu, Haikou (CN); Daoyou Lin, Haikou (CN)

(73) Assignee: Hainan Acoustics Laboratory, Institute of Acoustics, Chinese Academy of Sciences, Haikou (CN)

( * ) Notice: Subject to any disclaimer, the term of this patent is extended or adjusted under 35 U.S.C. 154(b) by 538 days.

(21) Appl. No.: 17/281,248

(22) PCT Filed: Dec. 9, 2020

(86) PCT No.: PCT/CN2020/134823
§ 371 (c)(1),
(2) Date: Mar. 30, 2021

(87) PCT Pub. No.: WO2022/120624
PCT Pub. Date: Jun. 16, 2022

(65) Prior Publication Data
US 2022/0404524 A1    Dec. 22, 2022

(51) Int. Cl.
*G01W 1/14* (2006.01)
*G01W 1/18* (2006.01)

(52) U.S. Cl.
CPC ............... *G01W 1/14* (2013.01); *G01W 1/18* (2013.01)

(58) Field of Classification Search
CPC .................................. G01W 1/14; G01W 1/18
See application file for complete search history.

(56) References Cited

U.S. PATENT DOCUMENTS 2,753,542 A * 7/1956 Rod ..................... G01F 23/2962
                                                           367/908
4,170,765 A * 10/1979 Austin ................ G01S 7/52004
                                                           367/908
(Continued)

FOREIGN PATENT DOCUMENTS

CN         101464524 A       6/2009
CN         103913208 A       7/2014
(Continued)

OTHER PUBLICATIONS

Liu Jianyi, Research of Ultrasonic Distance Measurement System Based-on ARM, Hebei University of Engineering for the Academic Degree of Master of Engineering, 2009, pp. 1-74.

*Primary Examiner* — David A. Rogers
(74) *Attorney, Agent, or Firm* — Bayramoglu Law Offices LLC

(57) ABSTRACT

The system comprises a rainfall monitoring module, a self-calibration and rainfall measurement module, a central processing module, a water level monitoring module, and a drainage module. The rainfall monitoring module is configured to monitor rainfall and send a rainfall signal to the central processing module. The self-calibration and rainfall measurement module is configured to transmit ultrasonic signals and receive calibration echo signals to compute the calibrated flight time, and transmit ultrasonic signals to the water surface in the bucket and receive the measured echo signal reflected by the water surface to obtain the measured flight time under the control of the central processing module. The central processing module is configured to receive the rainfall signal to start the water level monitoring module and the self-calibration and rainfall measurement module, which are used to calculate the rainfall value and output it in a fixed format.

10 Claims, 9 Drawing Sheets

(56) References Cited

U.S. PATENT DOCUMENTS

| | | | | |
|---|---|---|---|---|
| 4,210,969 A * | 7/1980 | Massa | ................ | G01S 7/52004 367/908 |
| 4,578,995 A * | 4/1986 | Meyer | ................ | G01W 1/14 73/170.17 |
| 4,610,164 A * | 9/1986 | Sobue | ................ | G01F 23/2965 73/290 V |
| 5,138,301 A * | 8/1992 | Delahaye | ................ | G01W 1/14 73/170.21 |
| 5,184,510 A * | 2/1993 | Rossman | ................ | G01F 23/296 73/1.73 |
| 5,394,748 A * | 3/1995 | McCarthy | ................ | G01W 1/14 73/170.21 |
| 5,571,963 A * | 11/1996 | Balchin | ................ | G01W 1/14 73/170.21 |
| 5,744,711 A * | 4/1998 | Rasmussen | ................ | G01W 1/14 73/170.21 |
| 5,987,994 A * | 11/1999 | Maltby | ................ | G01F 23/2962 73/290 V |
| 6,044,699 A * | 4/2000 | Greenblatt | ................ | G01W 1/14 73/170.21 |
| 6,751,571 B1 * | 6/2004 | Hallett | ................ | G01W 1/14 73/170.21 |
| 7,322,230 B2 * | 1/2008 | Noe | ................ | G01W 1/14 73/170.17 |
| 7,687,028 B1 * | 3/2010 | Coplen, II | ................ | G01N 1/18 73/863.41 |
| 7,966,153 B2 * | 6/2011 | Bangalore | ................ | G01W 1/14 702/188 |
| 8,322,209 B2 * | 12/2012 | Bostrom | ................ | G01F 23/2962 73/290 V |
| 9,645,284 B2 * | 5/2017 | Shin | ................ | G01W 1/14 |
| 11,531,139 B2 * | 12/2022 | Aughton | ................ | G01P 13/00 |
| 2007/0132599 A1 * | 6/2007 | DuFaux | ................ | G01W 1/14 702/3 |
| 2016/0047687 A1 * | 2/2016 | Prakash | ................ | G01F 23/64 73/1.73 |
| 2021/0026040 A1 * | 1/2021 | Aughton | ................ | G01W 1/14 |
| 2022/0155487 A1 * | 5/2022 | Jahn | ................ | G01W 1/14 |

FOREIGN PATENT DOCUMENTS

| | | | | |
|---|---|---|---|---|
| CN | 104237976 A | * | 12/2014 | |
| CN | 104266715 A | | 1/2015 | |
| CN | 104880740 B | * | 12/2017 | |
| CN | 206725597 U | | 12/2017 | |
| CN | 105717557 B | * | 3/2018 | |
| CN | 109444993 A | | 3/2019 | |
| CN | 110632682 A | | 12/2019 | |
| CN | 111708105 A | * | 9/2020 | |
| CN | 112925047 A | * | 6/2021 | |
| CN | 112099111 B | * | 8/2022 | ............ G01W 1/18 |
| DE | 4231235 A1 | * | 3/1994 | ............ G01W 1/14 |
| DE | 102007004705 A1 | * | 8/2008 | ............ G01F 23/20 |
| FI | 116322 B | | 10/2005 | |
| JP | 09243758 A | * | 9/1997 | |
| JP | H11118947 A | | 4/1999 | |
| JP | 2000249774 A | * | 9/2000 | |
| KR | 101467705 B1 | * | 12/2014 | |

* cited by examiner

AUTOMATIC TRIGGER AND SELF-CALIBRATION ULTRASONIC RAIN MEASUREMENT SYSTEM

CROSS REFERENCE TO THE RELATED APPLICATIONS

This application is the national stage entry of International Application PCT/CN2020/134823, filed on Dec. 9, 2020, the entire contents of which are incorporated herein by reference.

TECHNICAL FIELD

The present disclosure relates to the hydrological and meteorological measurement technology, which is a rain measurement system with automatic trigger and self-calibration.

BACKGROUND

At present, common rain gauges are weighing rain gauge, siphon rain gauge and tipping bucket rain gauge. Among them, weighing rain gauges and siphon rain gauges are with poor levels of automation because they require manual measurement; the tipping bucket of the tipping bucket rain gauge has four capacities, 0.1 mm, 0.2 mm, 0.5 mm and 1 mm, of which the tipping bucket with 0.1 mm capacity is the most used, but it also has defects. Although the accuracy of 0.1 mm is relatively high, after the rainfall becomes larger, there is a lag and spillage when tipping the bucket. So the error is relatively large. Besides, the tipping bucket rain gauge has a mechanically rotating structure, which affects its service life and requires regular maintenance.

Because of the strong penetrability of the ultrasonic transducer, it will produce a significant reflection when it encounters the interface to form a reflected echo, and it has the advantages of high frequency, short wavelength, and well direction. Therefore, it has been used in the rainfall detection to achieve accurate measurement. Many rain gauges are using ultrasonic technology. Since the propagation speed of ultrasonic waves in the air is affected by temperature and atmospheric pressure, the existing ultrasonic rain gauge only compensates for the speed of ultrasonic waves based on temperature and pressure. But the pressure and temperature sensors have measurement errors, which makes the measurement accuracy of the rain gauge uncertain. And too many measuring devices may cause hidden dangers to the stability of the system. In addition, most of the existing rain measurement systems use a continuous work mode or tipping bucket trigger mode. Tipping bucket is a mechanical rotational device that needs frequent maintenance and is not too smart. The continuous work of the system reduces the lifespan of the ultrasonic probe, and also increases the power consumption. Some ultrasonic rain gauges use liquid-medium probes or a single probe, which have the disadvantage of the wide blind zone in measurement.

SUMMARY

An object of the present disclosure is to overcome the above-mentioned shortcomings of the prior art and propose an automatic trigger and self-calibrating ultrasonic rain measurement system.

To achieve the above object, the present invention proposes an automatic trigger and self-calibrated ultrasonic rain measurement system, which includes a rainfall monitoring module, a self-calibration and rainfall measurement module, a central processing module, a water level monitoring module and a drainage module, wherein the rainfall monitoring module is configured to monitor rainfall and send a rainfall signal to the central processing module;

the self-calibration and rainfall measurement module is configured to transmit ultrasonic signals and receive calibration echo signals to perform speed self-calibration under the control of the central processing module, and obtain the calibrated flight time and send it to the central processing module, and it is also used to transmit ultrasonic signals to the water surface in the bucket under the control of the central processing module and receive the measurement echo signal reflected by the water surface for rainfall measurement, obtain the measured flight time and send it to the central processing module;

the central processing module is configured to receive the rainfall signal to start the water level monitoring module and to control the operation of the self-calibration and rainfall measurement module, to receive the self-calibration flight time and the measurement flight time, calculate the rainfall value and output it in a fixed format;

the water level monitoring module is configured to monitor the water level in the bucket, and send a drainage signal to the drainage module if the water level exceeds a predetermined height or the water level remains unchanged for a predetermined time;

the drainage module is configured to receive a drainage signal and open the drainage valve to drain the water from the bucket.

As an improvement of the above solution, the rainfall monitoring module includes a rainfall sensor and a rainfall monitoring circuit; wherein, the rain sensor is configured to send an induction signal to the rainfall monitoring circuit when it senses rain;

the rainfall monitoring circuit is configured to send a rainfall signal to the central processing module according to the received induction signal.

As an improvement of the above solution, the self-calibration and rainfall measurement module includes a time measurement unit, a channel selection unit, an automatic calibration unit and a rainfall measurement unit; wherein, the time measurement unit is configured to generate a pulse signal of a specific frequency under the control of the central processing module and send it to the channel selection unit, and calculate the calibration flight time to according to the calibration echo signal and send it to the central processing module, and calculate the measured flight time $t_1$ according to the measured echo signal and send it to the central processing module;

the channel selection unit is configured to select the automatic calibration unit and the rainfall measurement unit to work alternately under the control of the central processing module, send the received pulse signals to the automatic calibration unit and the rainfall measurement unit respectively, and receive the calibration echo signal collected by the automatic calibration unit and input it into the time measurement unit, and it is also used to receive the measurement echo signal collected by the rainfall measurement unit and input it into the time measurement unit;

the automatic calibration unit includes a first self-calibrating ultrasonic probe and a second self-calibrating ultrasonic probe, and the first self-calibrating ultrasonic probe and the second self-calibrating ultrasonic probe are arranged directly opposite each other with a fixed distance and same frequency, and the first self-calibrating ultrasonic probe is a transmitting probe, used to transmit an ultrasonic signal to the second self-calibrating ultrasonic probe under the control of a pulse signal; the second self-calibrating ultrasonic probe is a receiving probe, used to receive the calibration echo signal; the rainfall measurement unit includes a first measuring ultrasonic probe and a second measuring ultrasonic probe. The first measuring ultrasonic probe is a transmitting probe for transmitting ultrasonic signals to the water surface under the control of a pulse signal; the second measuring ultrasonic probe is a receiving probe for receiving measurement echo signals reflected by the water surface.

As an improvement of the above solution, the automatic calibration unit further includes an impedance conversion driving circuit, a limiting circuit and a signal processing circuit, wherein
the impedance conversion driving circuit is configured to receive the pulse signal, and send it to the first self-calibrating ultrasonic probe after amplification and impedance matching;
the limiting circuit is configured to limit the amplitude of the calibration echo signal received by the second self-calibrating ultrasonic probe and input it into the signal processing circuit;
the signal processing circuit is configured to filter and shape the amplitude-limited calibrated echo signal in sequence, and send it to the channel selection unit.

As an improvement of the above solution, the rainfall measurement unit further includes an impedance conversion driving circuit, a limiting circuit and a signal processing circuit, wherein
the impedance conversion driving circuit is configured to receive the pulse signal, and send it to the first measuring ultrasonic probe after amplification and impedance matching;
the limiting circuit is configured to limit the amplitude of the calibration echo signal received by the second measuring ultrasonic probe and input it into the signal processing circuit;
the signal processing circuit is configured to filter and shape the amplitude-limited measurement echo signal in sequence, and send it to the channel selection unit.

As an improvement of the above solution, the central processing module includes a wake-up unit, a self-calibration and rainfall measurement control unit, and a rainfall calculation unit; wherein
the wake-up unit is configured to receive the rainfall signal, and start the water level monitoring module and the self-calibration and rainfall measurement module to work;
the self-calibration and rainfall measurement control unit configured to control the self-calibration and rainfall measurement modules to perform self-calibration and rainfall measurement respectively;
the rainfall calculation unit is configured to receive the self-calibrated flight time and the measured flight time for calculating the rainfall and output it in a fixed format.

As an improvement of the above solution, the specific implementation process of the rainfall calculation unit is as follows: according to the distance h between the first self-calibrating ultrasonic probe and the second self-calibrating ultrasonic probe, and the calibration flight time $t_0$, the corrected propagation velocity v of the ultrasonic signal in the current environment is calculated in millimeters per microsecond (mm/ms):

$$v=h/t_0$$

according to the measured flight time $t_1$ in microseconds, the distance D from the first measuring ultrasonic probe to the water surface is calculated as:

$$D=v\times t_1/2$$

The vertical distance H from the first measuring ultrasonic probe to the water surface is calculated by the following formula:

$$H=\sqrt{D^2-(d/2)^2}$$

where d is the distance between the first measuring ultrasonic probe and the second measuring ultrasonic probe;
compare the vertical distance H from the first measuring ultrasonic probe to the water surface at the current moment and the vertical distance H1 from the first measuring ultrasonic probe to the water surface at the previous time
if H>H1, the rainfall ΔH is:
ΔH=H−H1
if H<H1, the rainfall ΔH is:
ΔH=0
H is assigned to H1, where H is the vertical distance from the first measured ultrasonic probe to the water surface obtained at the current moment;
expand the rainfall ΔH by a fixed multiple to an integer and output.

As an improvement of the above solution, the ultrasonic rain measurement system further comprises a power supply module as a DC power supply for this system.

Compared with the prior art, the advantage of the present disclosure are as follows:

1. The system provided by the present disclosure integrates functions such as automatic trigger, automatic calibration, automatic drainage, etc., which can be used in different wild environments.

2. The system provided by the present disclosure has a long service life and low maintenance cost, where, the automatic trigger function is realized by integrated circuits and rainfall sensing technology, which avoids the problem of mechanical triggering that is easy to wear and can effectively reduce maintenance times and maintenance costs; at the same time, the automatic trigger function can effectively extend the service life of the system and avoid the problems of machine deterioration and short life caused by the uninterrupted operation of the ultrasonic probe.

3. The automatic calibration function proposed in the present disclosure uses dual ultrasonic probes and performs acoustic self-calibration through the probe-to-beam mode, which is different from the prior art method of compensation by temperature and air pressure measurement. The system uses the same frequency ultrasound for calibration, which can effectively avoid the cumulative error caused by the multi-measurement unit compensation method, thus affecting the measurement accuracy.

4. The system provided by the present disclosure has high measurement accuracy, the use of a high-precision time-to-digital converter can make the time-of-flight resolution reach 22 ps, which can effectively improve the measurement accuracy of the ultrasonic rain measurement system, and the self-calibration function can ensure that the measurement accuracy of the system is less than 0.1 mm.

5. The system provided by the present disclosure has low power consumption, and the automatic trigger function of the system enables the power consumption of the system in the sleep state to be less than 20 mA, and the power consumption of the system in the running state is not more than 100 mA. Low power consumption enables the system to use lithium batteries and solar energy for long-term power supply in an environment without electricity.

6. The system provided by the present disclosure has a small measurement blind zone, and can effectively reduce the ultrasonic measurement blind zone by adopting a dual-probe measurement method. The measurement blind area of the system is not more than 30 mm, which is better than a single probe transceiver system with a 100 mm measurement blind area.

7. The present disclosure makes the measurement of rainfall more accurate by accurately measuring the height of the rain in the bucket.

DETAILED DESCRIPTION OF THE EMBODIMENTS

The technical solutions of the present disclosure will be described in detail with the following drawings and examples.

Figure 1:
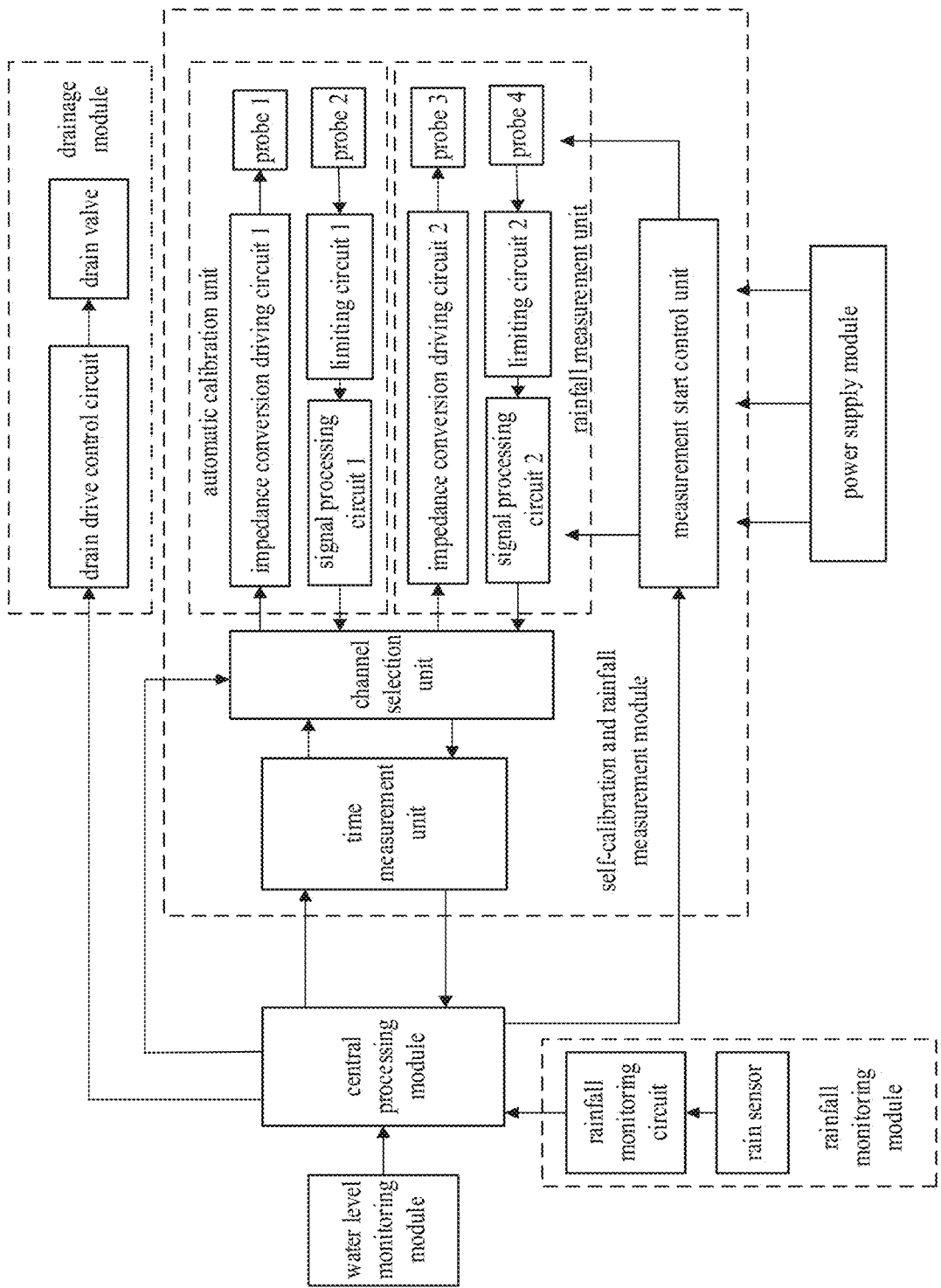
FIG. 1 is a block diagram of the automatic trigger and self-calibration ultrasonic rain measurement system of the present disclosure.

As shown in FIG. 1, the automatic trigger and self-calibration ultrasonic rain measurement system of the present disclosure includes a power supply module, a rainfall monitoring module, a self-calibration and rainfall measurement module, a central processing module, a water level monitoring module and a drainage module.

The power supply module is used to power the entire system;

the rainfall monitoring module is used to monitor whether it is raining, and send a rainfall signal to the central processing module when rainfall is detected;

the self-calibration and rainfall measurement module is used to transmit ultrasonic signals and receive calibration echo signals to perform speed self-calibration under the control of the central processing module, and obtain the calibrated flight time and send it to the central processing module, and it is also used to transmit ultrasonic signals to the water surface in the bucket under the control of the central processing module and receive the measurement echo signal reflected by the water surface for rainfall measurement, obtain the measured flight time and send it to the central processing module;

the central processing module is used to receive the rainfall signal to start the water level monitoring module and to control the operation of the self-calibration and rainfall measurement module, to receive the self-calibration flight time and the measurement flight time, calculate the rainfall value and output it in a fixed format;

the water level monitoring module is used to monitor the water level in the bucket, and send a drainage signal to the drainage module if the water level exceeds a predetermined height or the water level remains unchanged for a predetermined time;

the drainage module is used to open the drainage valve and empty the water from the bucket after received a drainage signal.

Each module is described in detail below.

Figure 2:
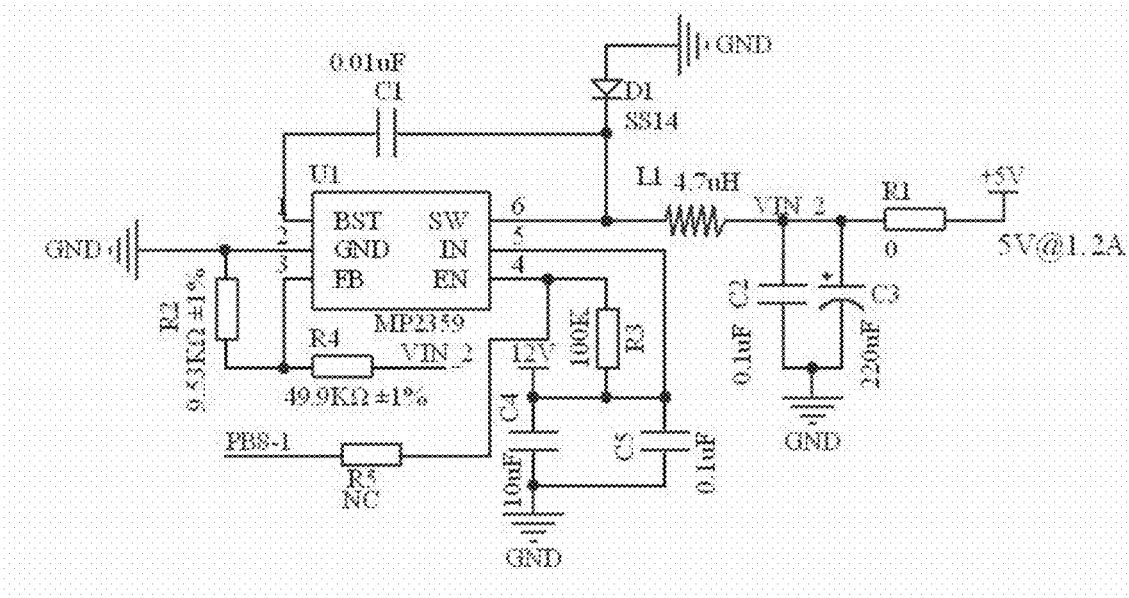
FIG. 2 is a schematic diagram of the DC12V-DC5V power supply circuit of the automatic trigger and self-calibration ultrasonic rain measurement system of the present disclosure.

Power supply module: the input of the system is a 12V DC power supply, and the power chip MP2359 is used to convert DC12v to DC5V through DC-DC, that is, DC12V to DC5V. The circuit diagram is shown in FIG. 2, and its output current can reach 1.2 A. According to the following formula, the resistance of the feedback resistor is calculated from the output voltage value. After calculation, the output voltage is 5V, the resistance R2=9.53 KΩ, R4=49.9 KΩ. L1 is a 4.7 uH power inductor, which can improve the load capacity of the system.

$$R2=R4/\{(V_{out}/0.81)-1\}$$

$$L=V_{OUT}\times(V_{IN}-V_{OUT})/V_{IN}\times\Delta I_L\times f_{SW}$$

where R4 and R2 are feedback resistors, $V_{OUT}$ is the output voltage, L is the output power inductor, $V_{IN}$ is the input voltage, $\Delta I_L$ is the ripple current, and $f_{SW}$ is the switching frequency.

Figure 3:
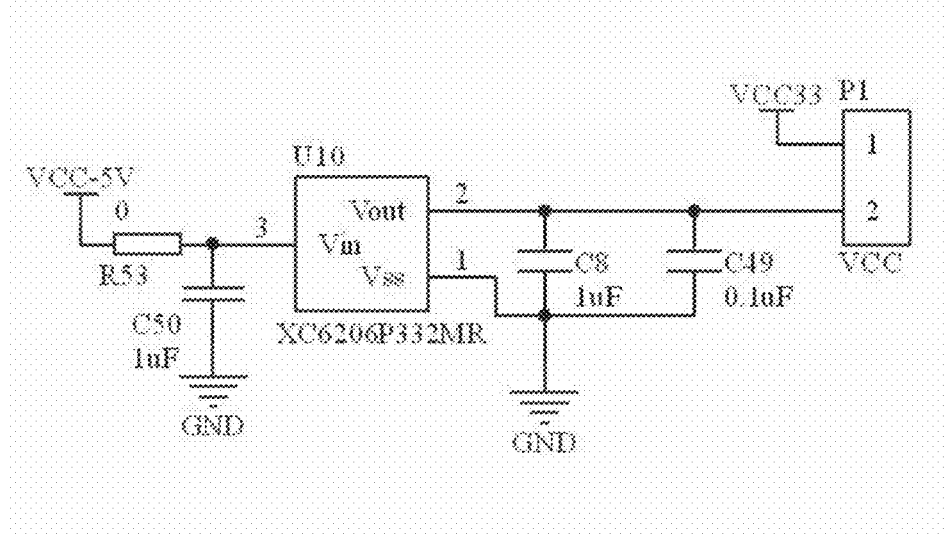
FIG. 3 is a schematic diagram of the DC5V-3.3V power supply circuit of the automatic trigger and self-calibration ultrasonic rain measurement system of the present disclosure.

Convert DC5V to DC3.3V: in the present disclosure, the system uses the XC6206P332MR chip to convert 5V DC power to 3.3V DC power. The chip is a low-noise and low-dropout regulator (LDO) with an output current of 200 mA, which mainly supplies power to the central processing module. The circuit structure is shown in FIG. 3, where C8 and C49 are output filter capacitors, and C50 is the input filter capacitor of the power supply.

Figure 4:
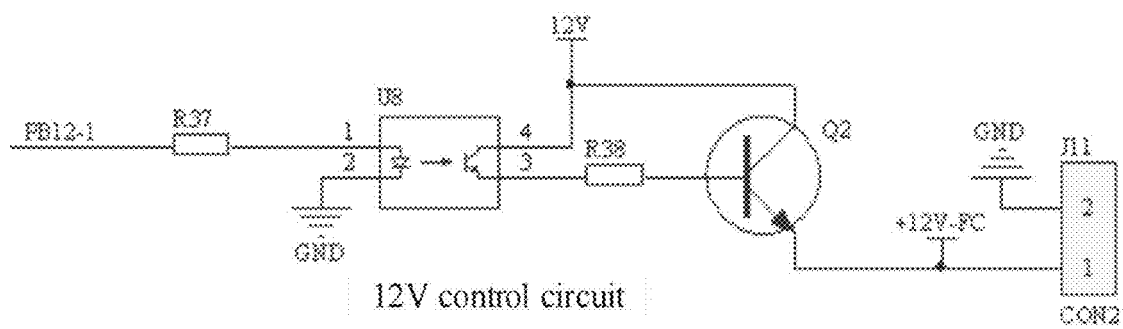
FIG. 4 is the schematic diagram of the 12V voltage control switch circuit of the automatic trigger and self-calibrated ultrasonic rain measurement system of the present disclosure.

The 12V power supply also provides power to the impedance conversion drive circuit and the automatic drainage module. FIG. 4 shows the voltage control switch circuit of the 12V power supply which adopts a combination of optical coupler TL621 and NPN transistor to increase the switch drive capability and effectively turn on and off 12V power supply. When PB12-1 is at a high level, the optical coupler device turns on, the 12V voltage passes through R38 to make the transistor Q2 turn on, and 12V power is outputted. Otherwise, the power supply is cut off.

The central processing module includes a wake-up unit, a self-calibration and rainfall measurement control unit, and a rainfall calculation unit; wherein
- the wake-up unit is used to receive the rainfall signal, and start the water level monitoring module and the self-calibration and rainfall measurement module to work;
- the self-calibration and rainfall measurement control unit configured to control the self-calibration and rainfall measurement modules to perform self-calibration and rainfall measurement respectively;
- the rainfall calculation unit is used to receive the self-calibrated flight time and the measured flight time for calculating the rainfall value and output it in a fixed format.

The central processing module uses the SMT32F407 chip, and the STM32F407 chip controls the working logic of the entire system and processes the measurement data. This chip has more advanced cores, more resource sets, stronger peripheral functions and higher performance, and its maximum operating frequency can reach 168 Mhz, which significantly improves the execution speed of the control algorithm. Its power consumption is only 238 uA/MHz.

The self-calibration and rainfall measurement module includes a time measurement unit, a channel selection unit, an automatic calibration unit and a rainfall measurement unit; wherein
- the time measurement unit is used to generate a pulse signal of a specific frequency under the control of the central processing module and send it to the channel selection unit, and calculate the calibration flight time to according to the calibration echo signal and send it to the central processing module, and calculate the measured flight time $t_1$ according to the measured echo signal and send it to the central processing module.

The system of the present disclosure uses a high-precision TDC-GP22 time-to-digital conversion chip to measure the flight time for improving the accuracy. The measurement range 2 of TDC-GP22 is selected, and its time measurement resolution is up to 22 ps. The STM32F407 chip communicates with the TDC-GP22 chip through the SPI interface. By configuring the registers of the TDC-GP22 chip, a pulse sequence can be generated to drive the transducer. At the same time, a start signal is generated inside the TDC-GP22 chip and transmits along the propagation chain formed by logic gates with fixed propagation time; after the echo signal received by the system is amplified, filtered and shaped, the voltage threshold is triggered to generate a stop signal; according to the number of logic gates that the start signal passes when the stop signal arrives, a one-way transmission time can be obtained. In the above process, the system will generate many interference signals, and the first wave detection function based on the TDC-GP22 chip can effectively filter out the interference signals, and this function can also effectively avoid the occurrence of erroneous zero-point detection, so the measurement accuracy of flight time can be improved.

If we measure a distance of 140 mm and the speed of sound is 340 m/s, ideally, the sound transmission time is 0.4117647058823529 ms. We use high-precision time-to-digital conversion method to measure time so that the time measurement accuracy can reach picoseconds (ps) which greatly improves the measurement accuracy of the system that can be less than 0.1 mm.

The flow of the first wave detection function of the TDC-GP22 chip includes:
1) set the offset value of the comparator through the pulse generator, and the stop mask window of the parameter DELVAL1 in register three is used to suppress the noise in the period before the stop signal arrives;
2) after the TDC-GP22 chip measures the time width of the rising and falling edges of the first wave, it will automatically set the offset value to 0 mV;
3) set the time measurement mask window of the parameter DELREL1 in register 3;
4) measure and record the width of the first wave and the half-wave period of the first real time as a measure of signal amplitude;
5) the TDC-GP22 chip will automatically record the stop pulse measured in the parameter DELREL1 and calculate the average value of the stop pulse, which can be read in register 4;
6) if the current measurement is not performed, the stop signal will not be generated, and the offset value will always remain at the amplitude value set when the first wave is detected.

The automatic calibration unit includes a first self-calibrating ultrasonic probe (the probe 1 in FIG. 1), a second self-calibrating ultrasonic probe (the probe 2 in FIG. 1), an impedance conversion drive circuit, a limiting circuit and a signal processing circuit, wherein, the first self-calibrating ultrasonic probe and the second self-calibrating ultrasonic probe are arranged directly opposite each other with a fixed distance and same frequency, and the first self-calibrating ultrasonic probe is a transmitting probe, used to transmit an ultrasonic signal to the second self-calibrating ultrasonic probe under the control of a pulse signal; the second self-calibrating ultrasonic probe is a receiving probe, used to receive the calibration echo signal;
- the impedance conversion driving circuit is used to receive the pulse signal, and send it to the first self-calibrating ultrasonic probe after amplification and impedance matching;
- the limiting circuit is used to limit the amplitude of the calibration echo signal received by the second self-calibrating ultrasonic probe and input it into the signal processing circuit;
- the signal processing circuit is used to filter and shape the amplitude-limited calibrated echo signal in sequence, and send it to the channel selection unit.

The rainfall measurement unit includes a first measuring ultrasonic probe (the probe 3 in FIG. 1), a second measuring ultrasonic probe (the probe 4 in FIG. 1), an impedance conversion driving circuit, a limiting circuit and a signal processing circuit, wherein the first measuring ultrasonic probe is a transmitting probe for transmitting an ultrasonic signal to the water surface under the control of a pulse signal; the second measuring ultrasonic probe is a receiving probe for receiving measurement echo signals reflected by the water surface.

Figure 5:
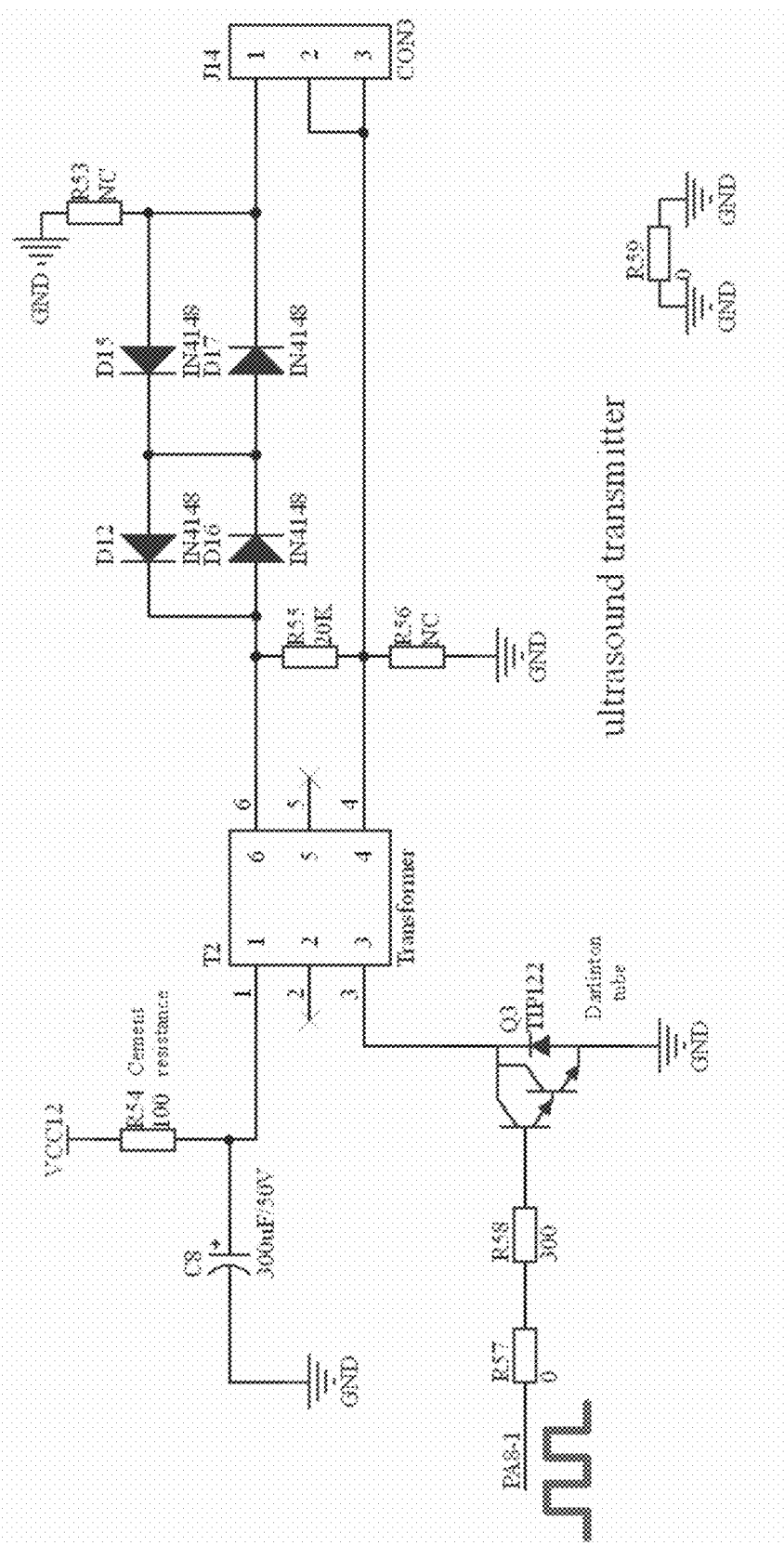
FIG. 5 is a schematic diagram of the ultrasonic driving impedance transformation circuit of the automatic triggering and self-calibrating ultrasonic rain measurement system of the present disclosure.

The impedance conversion driving circuit is used to receive the pulse signal, and send it to the first measuring ultrasonic probe after amplification and impedance matching. The impedance conversion drive circuit is shown in FIG. 5. After the pulse signal passes through R57, it passes through the current-limiting resistor R58. Besides, R54 is a current-limiting resistor, and R54 needs to use a cement resistor with a power of 5 W or more. The signal is amplified after passing through the Darlington tube TIP122, and then passed through the high-frequency transformer T2 (the transformer turns ratio is 16:270); the driving voltage can reach 110 V or more after being amplified by the transformer T2; then the pulse signal passes through the resistor R55, which plays the role of matching with the transducer, and then passes through four IN4148 diodes that can rectify the pulse signal, and then the transducer emits ultrasonic waves after passing through the high voltage driving.

The limiting circuit is used to limit the amplitude of the calibration echo signal received by the second measuring ultrasonic probe and input it into the signal processing circuit; the channel selection unit is used to select the automatic calibration unit and the rainfall measurement unit to work alternately under the control of the central processing module, send the received pulse signals to the automatic calibration unit and the rainfall measurement unit respectively, and receive the calibration echo signal collected by the automatic calibration unit and input it into the time measurement unit. It is also used to receive the measurement echo signal collected by the rainfall measurement unit and input it into the time measurement unit. The channel selection unit uses the CD4052B chip for channel switching to ensure that only one pair of probes is working at any time, and one of the pair of probes is in the transmitting state and the other is in the connected state, that is, the calibration unit and the measurement unit work alternately.

The signal processing circuit is used to filter and shape the amplitude-limited calibrated echo signal in sequence, and send it to the channel selection unit.

Figure 6:
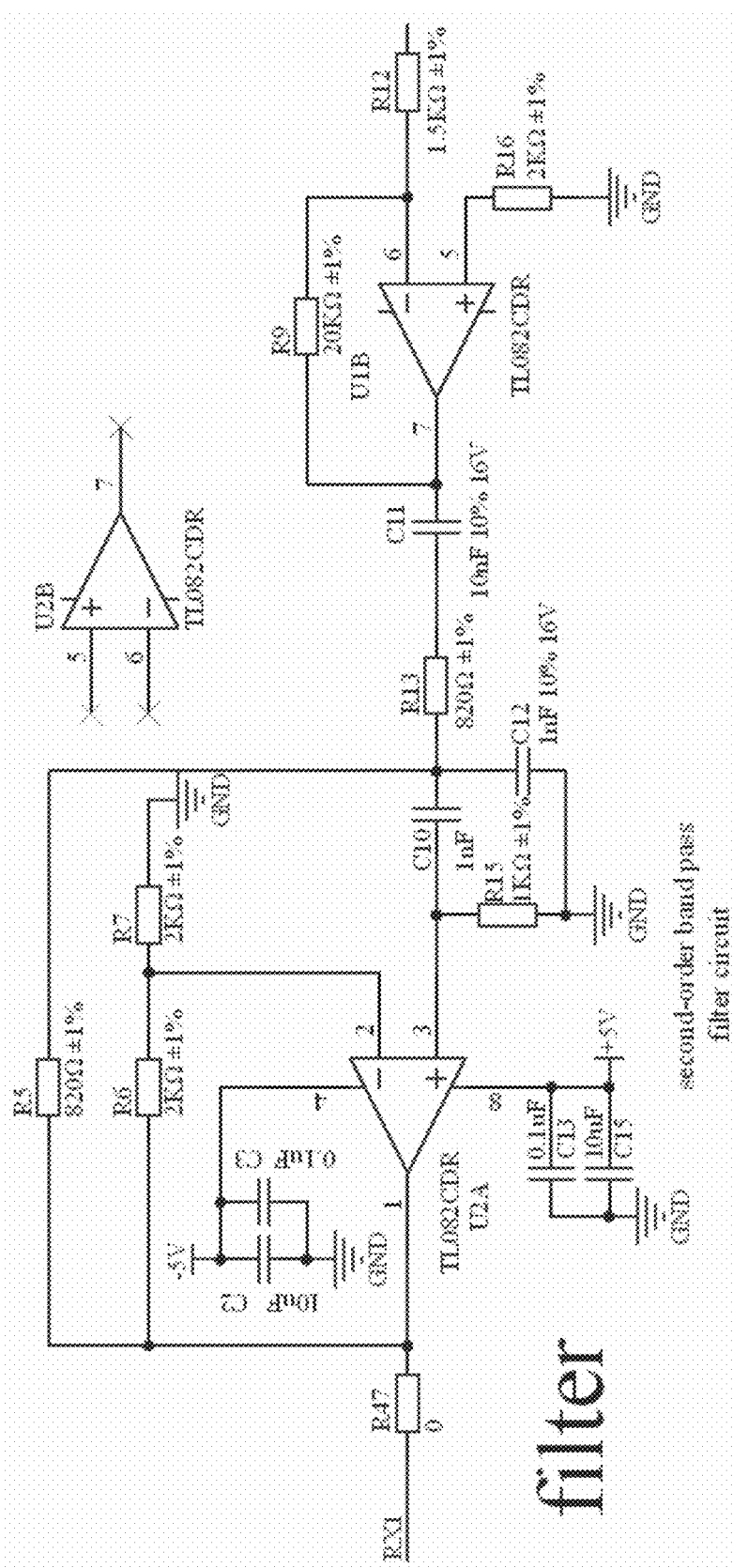
FIG. 6 is a schematic diagram of the 200 KHz second-order active bandpass filter circuit of the automatic trigger and self-calibrated ultrasonic rain measurement system of the present disclosure.

The receiving filter circuit of the signal processing circuit is shown in FIG. 6. The second-order bandpass filter circuit is used to design the filter circuit, and it includes the high-precision operational amplifier TL082. The center frequency of the designed circuit is 200 KHz, the bandwidth is 10 KHz, and the circuit consists of positive and negative voltage power supply, pin four is connected to –5V, pin eight is connected to +5V. The signal received by this circuit is first amplified by negative feedback through R12, then the DC signal is blocked by CII and finally filtered by a second-order filter circuit.

Figure 7:
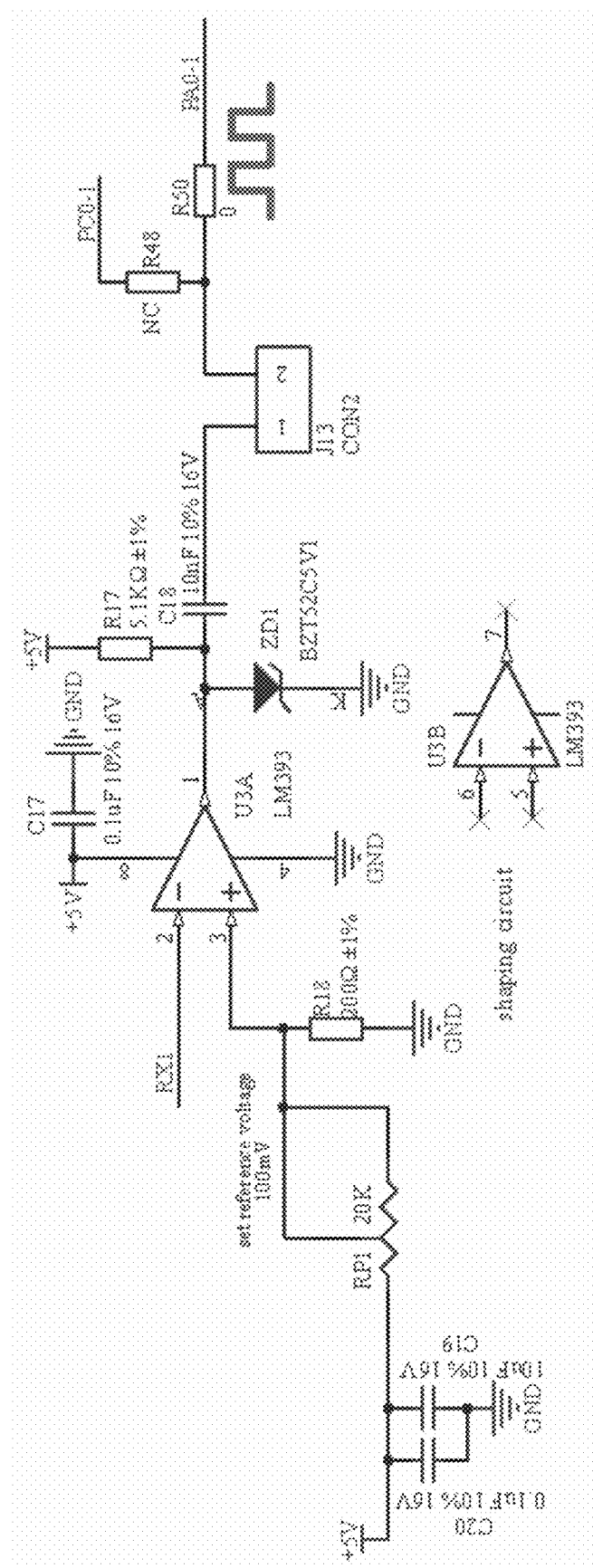
FIG. 7 is a schematic diagram of the shaping circuit of the signal processing circuit of the automatic trigger and self-calibration ultrasonic rain measurement system of the present disclosure.

The shaping circuit of the signal processing circuit is shown in FIG. 7, used for shaping the received signal, and it is designed based on the comparator LM293. When the input voltage of the comparator is higher than the set voltage 100 mV, it outputs a high voltage of 5V, on the contrary, it outputs a low voltage of 0V, where ZD1 is used for voltage stabilization protection, and R17 is used to increase the output voltage. The power supply voltage required by this circuit is +5V.

Figure 8:
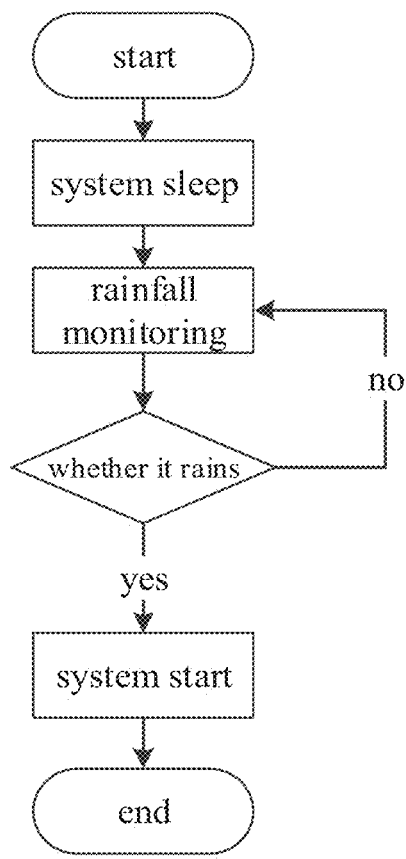
FIG. 8 is a working flow chart of the rainfall monitoring module of the automatic trigger and self-calibrated ultrasonic rain measurement system of the present disclosure.

The specific workflow of the system provided in this disclosure includes:
  step 1) The power system starts to supply power, and after the system is initialized, the central processing module enters the sleep state, the rainfall detection module enters the working state, and other modules remain in the sleep state.
  Step 2) The workflow of the automatic trigger function is shown in FIG. 8. After the system is powered on, it starts to continuously monitor whether it is raining, and when rainfall is detected, the rainfall monitoring module outputs a low voltage, and after the system recognizes a rainfall signal according to the low voltage, it can start to enter the working state. Otherwise, the system stays in a sleep state to save power.
  Step 3) When the rainfall reaches the preset value, the measurement system enters the working state of automatic calibration and automatic measurement. After the automatic calibration is completed, the rainfall measurement process is entered, and the measurement results will be packaged into a fixed format and output through the serial port. The specific method is as follows:

Automatic calibration, Since the speed of ultrasound propagation in the air is not constant, it will change with changes in parameters such as ambient temperature and atmospheric pressure and it is non-linear. Therefore, to accurately measure rainfall, sound speed correction is necessary.

Figure 9:
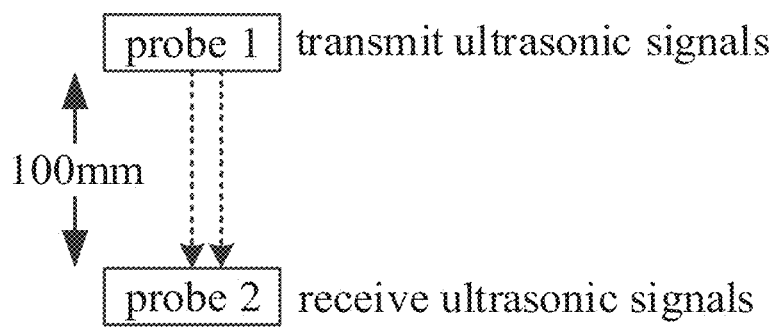
FIG. 9 is a schematic diagram of the automatic calibration unit of the automatic triggering and self-calibrating ultrasonic rain measurement system of the present disclosure.

The present disclosure adopts a double-probe acoustic cross-beam correction method, that is, ultrasonic waves are transmitted and received at a fixed distance. In the air, the ultrasonic wave with the same frequency has the same speed. So the accuracy of rainfall measurement can be ensured as long as the frequency of the calibrated ultrasonic probe is the same as that of the rainfall measurement probe. The installation method of the calibrated ultrasonic probes is shown in FIG. 9, and the two probes are installed vertically and directly in the air, where the first self-calibrated ultrasonic probe emits ultrasonic waves, and the second self-calibrated ultrasonic probe receives ultrasonic waves. The vertical distance between the two probes is 100 mm, and the ultrasonic correction speed v is calculated by the following formula:

$$h = v \times t_0$$

then $$v = h/t_0$$

where v is the corrected speed of the ultrasonic wave of the current environment in the air, to is the flight time of the ultrasonic wave in the air from the first self-calibrating ultrasonic probe to the second self-calibrating ultrasonic probe, and h is the vertical distance between the first self-calibrating ultrasonic probe and the second self-calibrating ultrasonic probe.

Figure 10:
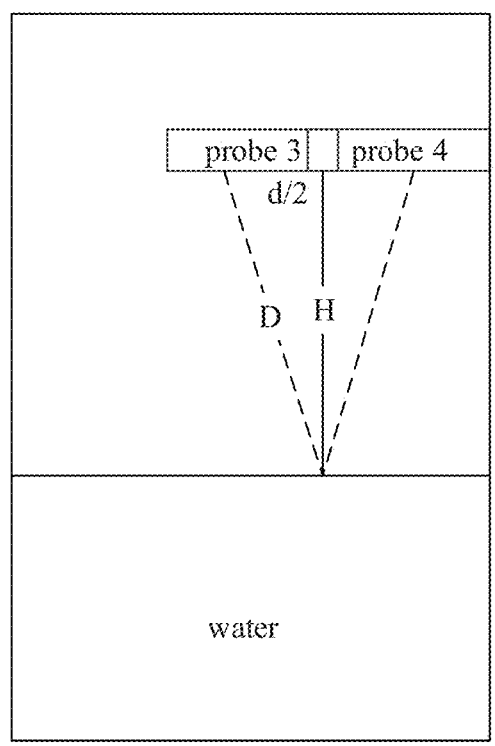
FIG. 10 is a schematic diagram of the rainfall measurement unit of the automatic trigger and self-calibrated ultrasonic rain measurement system of the present disclosure.

The installation method of the rain measurement probe is shown in FIG. 10. Two ultrasonic probes are used, one is used to emit ultrasonic waves, and the other is used to receive signals reflected from the water surface. The use of two probes for measurement can reduce the blind area during ultrasonic detection, and the detection blind area of the measurement method provided in the present disclosure is less than 50 mm. The ultrasonic waves are emitted by the first measuring ultrasonic probe, transmitted in the air, and reflected on the water surface, and the second measuring ultrasonic probe receives the reflected signal from the water surface, and the flight time of the ultrasonic wave transmitted in the air is $t_1$.

Assuming that the distance from the ultrasonic probe to the water surface is D, the distance D can be calculated by the following formula according to the ultrasonic propagation speed and flight time.

$$D = v \times t_1/2$$

where v is the ultrasonic correction speed in millimeters per microsecond, $t_1$ is the flight time of ultrasonic in the air in microseconds.

The distance between the first measuring ultrasonic probe and the second measuring ultrasonic probe for rainfall measurement is d mm, and the installation distance d in this system is 20 mm. The vertical distance H from the surface of the first measuring ultrasonic probe to the water surface can be obtained according to the following formula, $$H=\sqrt{D^2-(d/2)^2}$$

Compare the vertical distance H from the current first measurement ultrasonic probe to the water surface and the vertical distance H) from the last first measurement ultrasonic probe to the water surface, if H>H1, the rainfall ΔH is:
ΔH=H−H1
if H<H1, the rainfall ΔH is:
ΔH=0

H is assigned to H1, where H is the vertical distance from the first measured ultrasonic probe to the water surface obtained at the current moment;

the measurement result ΔH is expanded by a fixed multiple to an integer, and output through the serial port. The serial port transmission baud rate is set to 115200 bit/s.

Figure 11:
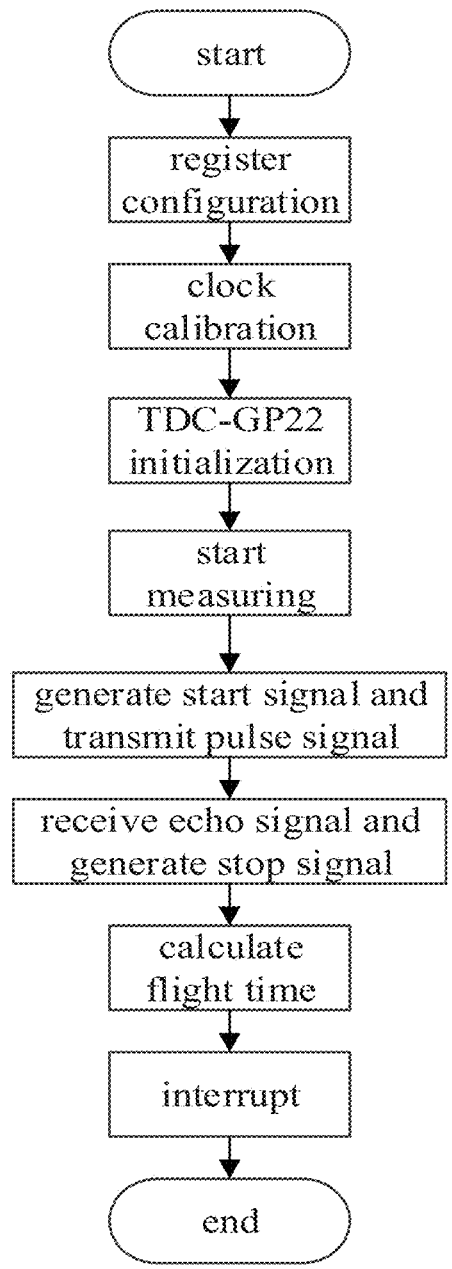
FIG. 11 is a flowchart of the time measurement unit of the automatic trigger and self-calibration ultrasonic rain measurement system of the present disclosure.

In the process of rainfall measurement, high-precision time measurement and Kalman filtering are required. The working method is as follows:

High-precision time measurement. In the ultrasonic rain measurement system designed based on the time difference method provided in the present disclosure, the measurement of the ultrasonic flight time is the most important work in the entire system, its measurement accuracy directly determines the accuracy of the entire measurement system, and the TDC-GP22 chip is used in this disclosure to perform high-precision time measurement. The workflow of this chip is shown as in FIG. 11. The system uses the STM32F407 chip to communicate with TDC-GP22 through SPI communication and configure its related registers. The STM32F407 chip sends the operation command "h50", and the TDC-GP22 chip performs a power-on reset. Then the STM32F407 chip configures the registers of the TDC-GP22 chip, sets the trigger mode of the start signal and the stop signal, the number of transmitted pulses, the frequency, the measurement mode and the calculation mode of the propagation time, etc., and configures the TDC-GP22 chip to send out 200 KHz pulses signal. The STM32F407 chip sends the Start_Cal_TDC command for the individual calibration, or sends the command "h03" to calibrate the clock of the TDC-GP22 chip. The STM32F407 chip sends the command "h70" to initialize the TDC-GP22 chip, then reads the status register, sends "h01" for a time measurement, and makes the TDC-GP22 chip emit 18 pulses, which trigger the stop signal after passing through the drive circuit. The TDC-GP22 chip calculates the flight time according to the stop signal, and generates an interrupt after the measurement is completed. The system enters the interrupt function to read the time measurement result on the register, and packs the flight time of the signal and stores it in the STM32F407 chip.

Measurement of original data filtering: Because the time data of ultrasonic propagation measurement in the air is affected by the electromagnetic interference of the system itself, the original time data has fluctuations. Therefore, the original data of the measurement needs to be processed by filtering algorithms. In addition to hardware filtering, the system provided by the present disclosure also uses Kalman filtering algorithm for noise reduction in software. The Kalman filtering state equation is described as:

$$x(k)=A \cdot x(k-1)+B \cdot \mu(k)+w(k)z(k)=H \cdot x(k)+y(k)$$

where x(k) is the state of the system at time k, u(k) is the control quantity, w(k) is the process noise conforming to the Gaussian distribution, z(k) is the observed value of the system at time k, and y(k) is the measurement noise conforming to the Gaussian distribution.

k represents time, x represents system state, P represents error covariance.

$$x(k|k-1)=A \cdot P(k-1|k-1) \cdot A^T+Q$$

The covariance between two random variables X and Y with expected values E[X] and E[Y] is defined as:

$$Cov=E[XY]-E[X]E[Y]$$

this formula measures the overall error of variables X and Y.

Step 4) Automatic drainage unit. In the present disclosure, when two situations occur, the drain valve needs to be opened to drain water.

When the height of the water in the bucket is higher than 140 mm, the system automatically opens the drain valve to empty the water from the bucket, and then continues to measure the rainfall. This system is designed to drain the water from the bucket within 30 s.

When the height of the water in the bucket does not reach 140 mm, but the height of the water in the bucket has not changed for 5 minutes, the system automatically opens the drain valve to empty the water from the bucket.

Step 5) When the system detects that there is no increase in rainfall within the specified time and the drainage is completed, the system will enter the sleep state again.

Figure 12:
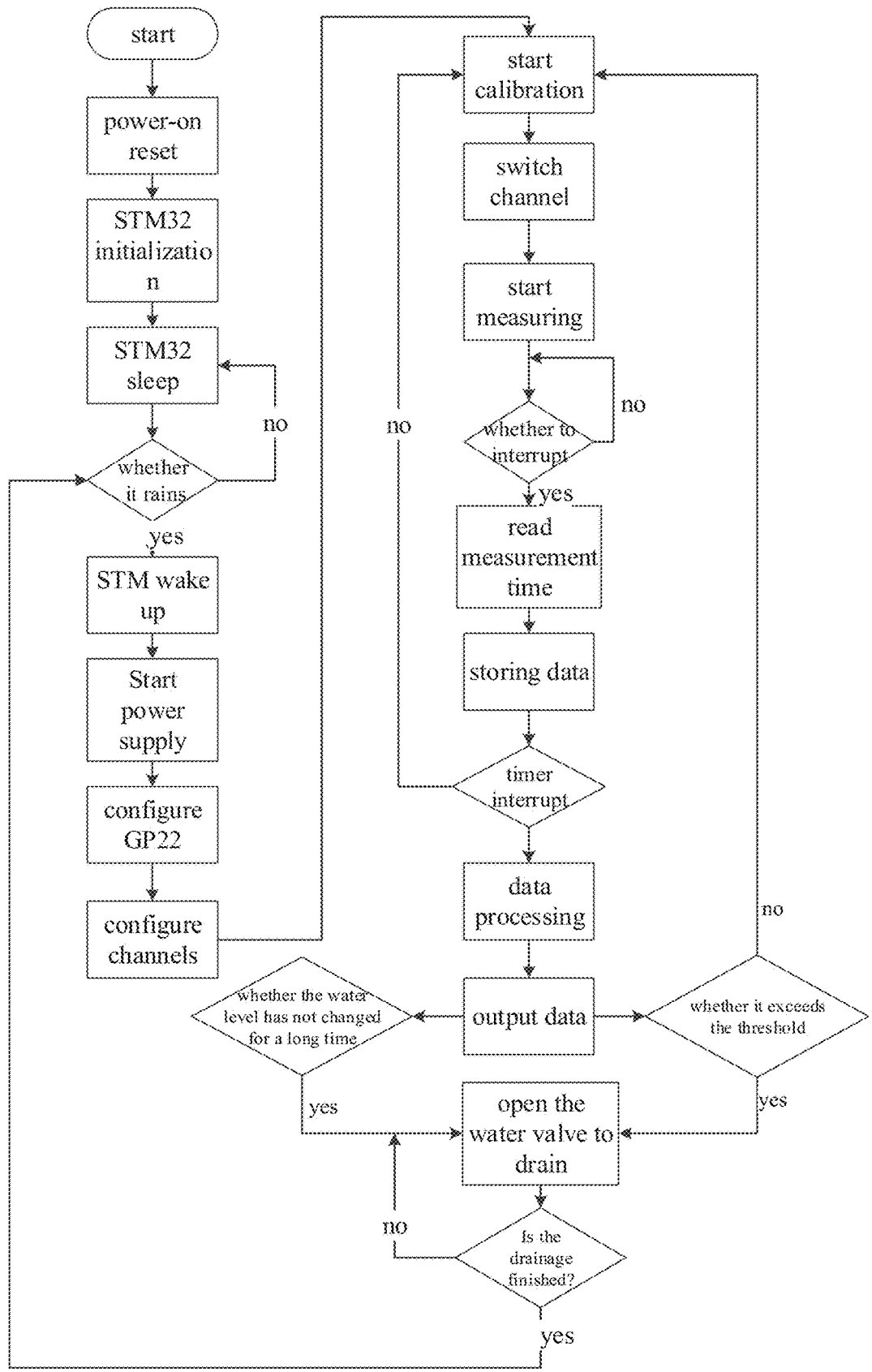
FIG. 12 is a flowchart of the automatic triggering and self-calibrating ultrasonic rain measurement system of the present disclosure.

FIG. 12 shows the program operation flowchart of the system. When the system is powered on, it first initializes and then enters the sleep state; when rainfall is detected, the STM32F4 chip wakes up from the sleep state and starts the system; when the rainfall reaches the preset value, the system starts to configure the time measurement chip, configure the number of transmitted pulses and the transmission frequency, and then the system starts self-calibration and measurement; the system determines whether to drain the water according to the measurement data, and outputs the data in a fixed format. If there is no rainfall, the system will continue to sleep. After the measurement, the system will return to sleep.

The above-mentioned embodiments are merely embodiments of the present disclosure, and are not intended to limit the scope of protection of the present disclosure. Although the present disclosure has been described in detail with reference to the embodiments, For those ordinary skilled in the art to which the present disclosure belongs should know that several simple deductions or replacements may be made without departing from the conception of the present disclosure, all of which shall be considered to belong to the protection scope of the present disclosure.

What is claimed is:

1. An automatic trigger and self-calibrated ultrasonic rain measurement system, comprising: a rainfall monitoring module, a self-calibration and rainfall measurement module, a central processing module, a water level monitoring module, and a drainage module; wherein the rainfall monitoring module is configured to monitor rainfall and send a rainfall signal to the central processing module;

the self-calibration and rainfall measurement module is configured to transmit ultrasonic signals and receive calibration echo signals to perform speed self-calibration under a control of the central processing module, and obtain a calibrated flight time and send the calibrated flight time to the central processing module, and the self-calibration and rainfall measurement module is also configured to transmit the ultrasonic signals to a water surface in a bucket under the control of the central processing module and receive a measurement echo signal reflected by the water surface for rainfall measurement, obtain a measured flight time and send the measured flight time to the central processing module;

the central processing module is configured to receive the rainfall signal to start the water level monitoring module and to control an operation of the self-calibration and rainfall measurement module, to receive a self-calibration flight time and the measured flight time, calculate a rainfall value and output the rainfall value in a fixed format;

the water level monitoring module is configured to monitor a water level in the bucket, and send a drainage signal to the drainage module if the water level exceeds a predetermined height or the water level remains unchanged for a predetermined time;

the drainage module is configured to open a drainage and empty water from the bucket after received a drainage signal, wherein the self-calibration and rainfall measurement module includes a time measurement unit, a channel selection unit, an automatic calibration unit and a rainfall measurement unit; wherein the time measurement unit is configured to generate a pulse signal of a specific frequency under the control of the central processing module and send the pulse signal to the channel selection unit, and calculate the calibrated flight time to according to the calibration echo signal and send the calibrated flight time $t_0$ to the central processing module, and calculate the measured flight time $t_1$ according to the measurement echo signal and send the measured flight time $t_1$ to the central processing module;

the channel selection unit is configured to select the automatic calibration unit and the rainfall measurement unit to work alternately under the control of the central processing module, send the pulse signals to the automatic calibration unit and the rainfall measurement unit respectively, and receive the calibration echo signal collected by the automatic calibration unit and input the calibration echo signal into the time measurement unit, and the channel selection unit is also configured to receive the measurement echo signal collected by the rainfall measurement unit and input the measurement echo signal into the time measurement unit;

the automatic calibration unit includes a first self-calibrating ultrasonic probe and a second self-calibrating ultrasonic probe, and the first self-calibrating ultrasonic probe and the second self-calibrating ultrasonic probe are arranged directly opposite each other with a fixed distance and same frequency, and the first self-calibrating ultrasonic probe is a transmitting probe, used to transmit the ultrasonic signal to the second self-calibrating ultrasonic probe under a control of the pulse signal; the second self-calibrating ultrasonic probe is a receiving probe, used to receive the calibration echo signal;

the rainfall measurement unit includes a first measuring ultrasonic probe and a second measuring ultrasonic probe, the first measuring ultrasonic probe is a transmitting probe for transmitting the ultrasonic signal to the water surface under the control of the pulse signal; the second measuring ultrasonic probe is a receiving probe for receiving the measurement echo signals reflected by the water surface.

2. The automatic trigger and self-calibrated ultrasonic rain measurement system according to claim 1, wherein the rainfall monitoring module includes a rain sensor and a rainfall monitoring circuit; wherein the rain sensor is configured to send an induction signal to the rainfall monitoring circuit when it senses rain;

the rainfall monitoring circuit is configured to send the rainfall signal to the central processing module according to the induction signal.

3. The automatic trigger and self-calibrated ultrasonic rain measurement system according to claim 1, wherein the automatic calibration unit further includes an impedance conversion driving circuit, a limiting circuit and a signal processing circuit, wherein the impedance conversion driving circuit is configured to receive the pulse signal, and send the pulse signal to the first self-calibrating ultrasonic probe after amplification and impedance matching;

the limiting circuit is configured to limit an amplitude of the calibration echo signal received by the second self-calibrating ultrasonic probe to obtain an amplitude-limited calibration echo signal and input the amplitude-limited calibration echo signal into the signal processing circuit;

the signal processing circuit is configured to filter and shape the amplitude-limited calibration echo signal in sequence, and send the amplitude-limited calibration echo signal to the channel selection unit.

4. The automatic trigger and self-calibrated ultrasonic rain measurement system according to claim 1, wherein the rainfall measurement unit further includes an impedance conversion driving circuit, a limiting circuit and a signal processing circuit, wherein the impedance conversion driving circuit is configured to receive the pulse signal, and send the pulse signal to the first measuring ultrasonic probe after amplification and impedance matching;

the limiting circuit is configured to limit an amplitude of the calibration echo signal received by the second measuring ultrasonic probe to obtain an amplitude-limited measurement echo signal and input the amplitude-limited measurement echo signal into the signal processing circuit;

the signal processing circuit is configured to filter and shape the amplitude-limited measurement echo signal in sequence, and send the amplitude-limited measurement echo signal to the channel selection unit.

5. The automatic trigger and self-calibrated ultrasonic rain measurement system according to claim 1, further comprising: a power supply module for providing a DC power supply for an operation of the automatic trigger and self-calibrated ultrasonic rain measurement system.

6. The automatic trigger and self-calibrated ultrasonic rain measurement system according to claim 1, wherein the central processing module includes a wake-up unit, a self-calibration and rainfall measurement control unit, and a rainfall calculation unit; wherein the wake-up unit is configured to receive the rainfall signal, and start the water level monitoring module and the self-calibration and rainfall measurement module to work;

the self-calibration and rainfall measurement control unit is configured to control the self-calibration and rainfall measurement module to perform self-calibration and rainfall measurement respectively;

the rainfall calculation unit is configured to receive the self-calibration flight time and the measured flight time for calculating the rainfall value then outputs the rainfall value in the fixed format.

7. The automatic trigger and self-calibrated ultrasonic rain measurement system according to claim 6, a specific realization process of the rainfall calculation unit comprising:

according to a distance h between the first self-calibrating ultrasonic probe and the second self-calibrating ultrasonic probe, and the calibrated flight time to, calculating a corrected propagation velocity v of the ultrasonic signal in a current environment, in millimeters per microsecond:

$$v = h/t_0,$$

according to the measured flight time $t_1$ in microseconds, the distance D from the first measuring ultrasonic probe to the water surface as:

$$D = v \times t_1/2,$$

calculating a vertical distance H from the first measuring ultrasonic probe to the water surface by the following formula:

$$H = \sqrt{D^2 - (d/2)^2},$$

where, d is the distance between the first measuring ultrasonic probe and the second measuring ultrasonic probe;

comparing the vertical distance H from the first measuring ultrasonic probe to the water surface at the current moment and a vertical distance H1 from the first measuring ultrasonic probe to the water surface at the previous time, if H>H1, the rainfall ΔH is:
ΔH=H−H1,
if H<H1, the rainfall ΔH is:
ΔH=0, assigned H to H1, where H is the vertical distance from the first measured ultrasonic probe to the water surface obtained at the current moment;

expanding the rainfall ΔH by a fixed multiple to an integer and outputting.

8. An automatic trigger and self-calibrated ultrasonic rain measurement system, comprising: a rainfall monitoring module, a self-calibration and rainfall measurement module, a central processing module, a water level monitoring module, and a drainage module; wherein the rainfall monitoring module is configured to monitor rainfall and send a rainfall signal to the central processing module;

the self-calibration and rainfall measurement module is configured to transmit ultrasonic signals and receive calibration echo signals to perform speed self-calibration under a control of the central processing module, and obtain a calibrated flight time and send the calibrated flight time to the central processing module, and the self-calibration and rainfall measurement module is also configured to transmit the ultrasonic signals to a water surface in a bucket under the control of the central processing module and receive a measurement echo signal reflected by the water surface for rainfall measurement, obtain a measured flight time and send the measured flight time to the central processing module;

the central processing module is configured to receive the rainfall signal to start the water level monitoring module and to control an operation of the self-calibration and rainfall measurement module, to receive a self-calibration flight time and the measured flight time, calculate a rainfall value and output the rainfall value in a fixed format;

the water level monitoring module is configured to monitor a water level in the bucket, and send a drainage signal to the drainage module if the water level exceeds a predetermined height or the water level remains unchanged for a predetermined time;

the drainage module is configured to open a drainage and empty water from the bucket after received a drainage signal, wherein the central processing module includes a wake-up unit, a self-calibration and rainfall measurement control unit, and a rainfall calculation unit; wherein the wake-up unit is configured to receive the rainfall signal, and start the water level monitoring module and the self-calibration and rainfall measurement module to work;

the self-calibration and rainfall measurement control unit is configured to control the self-calibration and rainfall measurement module to perform self-calibration and rainfall measurement respectively;

the rainfall calculation unit is configured to receive the self-calibration flight time and the measured flight time for calculating the rainfall value then outputs the rainfall value in the fixed format, a specific realization process of the rainfall calculation unit comprising:

according to a distance h between a first self-calibrating ultrasonic probe and a second self-calibrating ultrasonic probe, and the calibrated flight time to, calculating a corrected propagation velocity v of the ultrasonic signal in a current environment, in millimeters per microsecond:

$$v = h/t_0,$$

according to the measured flight time $t_1$ in microseconds, the distance D from the first measuring ultrasonic probe to the water surface as:

$$D = v \times t_1/2,$$

calculating a vertical distance H from the first measuring ultrasonic probe to the water surface by the following formula:

$$H = \sqrt{D^2 - (d/2)^2},$$

where, d is the distance between the first measuring ultrasonic probe and the second measuring ultrasonic probe;

comparing the vertical distance H from the first measuring ultrasonic probe to the water surface at the current moment and a vertical distance H1 from the first measuring ultrasonic probe to the water surface at the previous time, if H>H1, the rainfall ΔH is:
ΔH=H−H1,
if H<H1, the rainfall ΔH is:
ΔH=0,
assigned H to H1, where H is the vertical distance from the first measured ultrasonic probe to the water surface obtained at the current moment;
expanding the rainfall ΔH by a fixed multiple to an integer and outputting.

9. The automatic trigger and self-calibrated ultrasonic rain measurement system according to claim 8, wherein the rainfall monitoring module includes a rain sensor and a rainfall monitoring circuit; wherein
the rain sensor is configured to send an induction signal to the rainfall monitoring circuit when it senses rain;
the rainfall monitoring circuit is configured to send the rainfall signal to the central processing module according to the induction signal.

10. The automatic trigger and self-calibrated ultrasonic rain measurement system according to claim 8, further comprising: a power supply module for providing a DC power supply for an operation of the automatic trigger and self-calibrated ultrasonic rain measurement system.

\* \* \* \* \*